J. M. CURLESS.
Excavators.

No. 138,485. Patented May 6, 1873.

UNITED STATES PATENT OFFICE.

JOHN M. CURLESS, OF CEDAR RAPIDS, IOWA.

IMPROVEMENT IN EXCAVATORS.

Specification forming part of Letters Patent No. 138,485, dated May 6, 1873; application filed March 12, 1873.

*To all whom it may concern:*

Be it known that I, JOHN M. CURLESS, residing in Cedar Rapids, in the county of Linn and State of Iowa, have invented a certain new and useful Improvement in Ditching-Machines, of which the following is a full, clear, and exact description, reference being had to the annexed drawing, in which—

Figure 1:
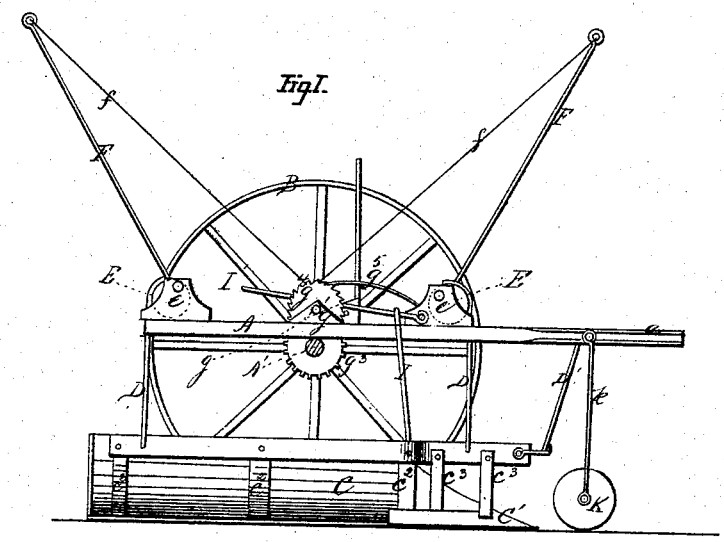
Figure 2:
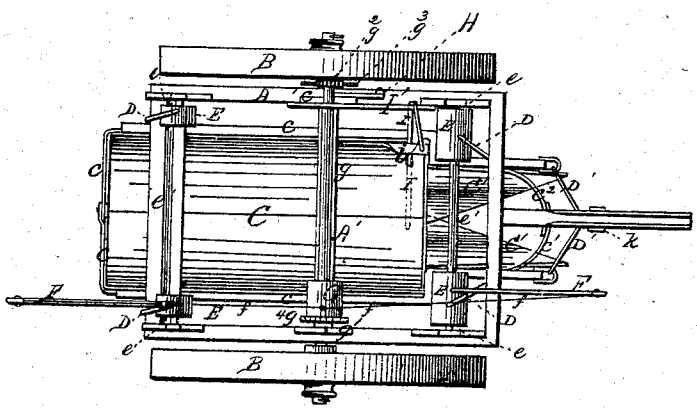

Figure 1 is a view in elevation with one of the wheels removed and its axle taken in cross-section; and Fig. 2 is a plan view of my improved ditching-machine.

Corresponding parts in the figures are designated by like letters of reference.

The nature of this invention consists in constructing the cart in two parts, which are suitably hinged together and supplied with plows, and in the mechanism for raising and lowering the cart to allow it to be loaded and unloaded, substantially as hereinafter more fully set forth.

To enable others to make and use my invention, I will proceed to describe it.

In the drawing, A refers to a frame having a tongue to which to attach the animals for drawing the machine, and mounted upon and fastened to the axle A' by any suitable means, the said axle being supplied with wheels B B. C refers to the cart, which is composed of two parts hinged together by uniting the rear end of the cart-frame $c$ by means of a pivot and the front end of the same by strips $c^1$ $c^1$ pivoted one to the other, and riveted or otherwise fastened to the inner sides of the said frame. The shape of the cart is semi-cylindrical, such shape being given it to enable its bottom, when in contact with the ground, to be relieved of friction as much as possible. The bottom and sides of each part of the cart are preferably constructed in one and of the same piece of metal, and fastened in any suitable way to the two parts of the cart-frame $c$, and transverse pieces $c^2$ $c^2$ united to the latter. Suspended from and rigidly secured to the lower side of the forward-projecting ends of the cart-frame $c$, by means of standards $c^3$ $c^3$, are plows C' C', with their mold-boards turned toward one another so as to take the dirt from the plow-points and throw it into the cart directly in rear of the plows. The cart is suspended from the frame A by four or more chains or other substantial means, D D, and from the tongue $a$ by a chain, D', the former being attached to, and, when the cart is elevated, wound around, eccentrics or rollers E E, a pair of which is journaled at each end of the frame by short axles entering the perforated plates $e$ $e$ soldered or otherwise fastened to the said frame, and connected together by a rod or bar, $e'$ $e'$. F F refer to two levers or rods, one of which is set into and fastened, by solder or otherwise, to the periphery of one of the forward eccentrics E, while the other is likewise attached to one of the rear eccentrics E and out of line with the former lever. A cord or chain, $f$ $f$, extends from the upper or eye end of each of these levers F F to a drum, G, which drum, when operated or revolved in one direction, causes the said cords to be wound around it, which brings the levers down to a horizontal position, causing the eccentrics to be revolved and the chains D D wound thereon, thereby effecting the raising of the cart. The drum G is located upon a shaft, $g$, having its bearings in ears $g^1$ upon the frame A, and receiving its motion through a pinion, $g^2$, and toothed wheel $g^3$ upon the hub of one of the transporting-wheels. This drum is further supplied with a ratchet, $g^4$, and pawl $g^5$. To throw the drum-shaft out of gear with its motor an inclined plane or wedge, H, is fitted alongside of one of the axle-bearings or ears $g^1$, and underneath that end of said shaft having the pinion $g^2$, in such a manner as to permit of its being brought in contact with or withdrawn from the shaft. To assist in operating the inclined plane it may be provided with an arm or lever extending out within convenient grasp of the driver or operator. A chain or other suitable means, I, with its ends attached, respectively, to one-half of the cart and to a flat spring, $i$, attached to the other half of cart and looped over a rod, I', is for the purpose of holding the parts of the cart together when loaded. By looping the chain it is enabled to be manipulated as the cart is raised and lowered so as to tighten and loosen it—the chain. To support the tongue $a$ standards $k$, between the lower ends of which a small wheel, K, is journaled, are hung to the sides thereof—the tongue.

Having thus fully described my invention, what I claim, and desire to secure by Letters Patent, is—

1. The cart C, composed of two parts hinged together, substantially in the manner described and shown, and supplied with plows C', as and for the purpose set forth.

2. The combination of the cart C, lifting-chains D D, eccentrics or rollers E E, levers F F, cords $f\,f$, drum G, shaft $g$, gears $g^2\,g^3$, frame A, axle A', and wheels B, substantially as and for the purpose set forth.

3. The inclined plane or wedge H, fitted to slide upon the side of one of the bearings of the shaft $g$, and beneath that end of the latter having the pinion $g^2$, substantially as and for the purpose specified.

In testimony whereof I have hereto signed my name this 8th day of March, 1873, in presence of subscribing witnesses.

JOHN M. CURLESS.

Witnesses:
JAMES J. CHILD,
J. M. MAY.